United States Patent
Watanabe et al.

(10) Patent No.: US 8,584,261 B2
(45) Date of Patent: Nov. 12, 2013

(54) METHOD OF DETERMINING A SPRING CONSTANT OF A CANTILEVER AND SCANNING PROBE MICROSCOPE USING THE METHOD

(75) Inventors: Masafumi Watanabe, Chiba (JP); Hiroumi Momota, Chiba (JP)

(73) Assignee: SII Nanotechnology Inc., Chiba (JP)

( * ) Notice: Subject to any disclaimer, the term of this patent is extended or adjusted under 35 U.S.C. 154(b) by 0 days.

(21) Appl. No.: 13/545,197

(22) Filed: Jul. 10, 2012

(65) Prior Publication Data
US 2013/0061357 A1    Mar. 7, 2013

(30) Foreign Application Priority Data

Sep. 6, 2011    (JP) .................................. 2011-193940

(51) Int. Cl.
*G01Q 70/16*    (2010.01)
*G01Q 70/08*    (2010.01)
*G01Q 60/22*    (2010.01)
*G01Q 70/10*    (2010.01)
*G01Q 60/38*    (2010.01)

(52) U.S. Cl.
CPC ............... *G01Q 60/22* (2013.01); *G01Q 70/10* (2013.01); *G01Q 60/38* (2013.01)
USPC ................... 850/60; 850/33; 850/57; 850/56; 850/59

(58) Field of Classification Search
CPC ........ B82Y 35/00; B82Y 20/00; B82Y 10/00; B82Y 15/00; G01Q 60/22; G01Q 70/10; G01Q 70/16; G01Q 80/00; G01Q 60/38; G01Q 70/00; G01Q 10/04; G01Q 10/065; G01Q 20/02; G01Q 60/18; G01Q 60/32; G01Q 70/12

USPC ........ 73/504.12, 105, 504.15; 850/33, 57, 60, 850/40, 5, 53, 56, 59, 6, 1, 18, 30, 52, 62; 250/306, 309, 307, 215, 234, 552
See application file for complete search history.

(56) References Cited

U.S. PATENT DOCUMENTS

| | | | | |
|---|---|---|---|---|
| 4,912,487 | A  * | 3/1990 | Porter et al. ................... | 347/255 |
| 6,255,727 | B1 * | 7/2001 | Khoury ......................... | 257/693 |
| 6,415,653 | B1 * | 7/2002 | Matsuyama .................... | 73/105 |
| 6,458,206 | B1 * | 10/2002 | Givargizov et al. ........... | 117/101 |
| 6,566,617 | B1 * | 5/2003 | Suzuki et al. ................. | 200/181 |

(Continued)

FOREIGN PATENT DOCUMENTS

| | | |
|---|---|---|
| JP | 10-282128 | 10/1998 |
| JP | 2000-097825 | 4/2000 |

OTHER PUBLICATIONS

Fritz et al., Determination of Young's modulus of electroplated nickel, 2003, Electrochimica Acta 48 (2003), p. 3029-3035.*

*Primary Examiner* — David A Vanore
(74) *Attorney, Agent, or Firm* — Brinks Gilson & Lione

(57) ABSTRACT

In a cantilever which is used in a scanning probe microscope or the like and has a trapezoidal cross-sectional shape formed through anisotropic etching in a silicon process, a cantilever spring constant is determined without measuring a thickness directly. A cantilever thickness is determined based on upper base and lower base lengths of the trapezoidal cross-sectional shape and geometric regularity of a surface generated by the anisotropic etching. Then, the cantilever spring constant is determined based on the cantilever thickness, a cantilever length, and a Young's modulus.

7 Claims, 2 Drawing Sheets

(56) References Cited

U.S. PATENT DOCUMENTS

| | | | |
|---|---|---|---|
| 6,670,208 B2* | 12/2003 | Oda et al. | 438/29 |
| 6,852,968 B1* | 2/2005 | Ouchi et al. | 250/234 |
| 7,291,511 B2* | 11/2007 | Inaguma et al. | 438/52 |
| 7,325,452 B2* | 2/2008 | Takahashi et al. | 73/504.15 |
| 7,358,648 B2* | 4/2008 | Nakamura et al. | 310/333 |
| 7,578,187 B2* | 8/2009 | Takahashi et al. | 73/504.12 |
| 7,599,277 B1* | 10/2009 | Kato et al. | 369/112.27 |
| 7,770,231 B2* | 8/2010 | Prater et al. | 850/6 |
| 7,902,942 B2* | 3/2011 | Hashimura | 333/186 |
| 7,913,560 B2* | 3/2011 | Higuchi et al. | 73/504.16 |
| 8,011,016 B2* | 8/2011 | Sulzbach et al. | 850/53 |
| 8,250,668 B2* | 8/2012 | Holscher et al. | 850/33 |
| 8,320,228 B2* | 11/2012 | Kato et al. | 369/112.27 |
| 2002/0036753 A1* | 3/2002 | Kasama et al. | 353/31 |
| 2006/0196267 A1* | 9/2006 | Takahashi et al. | 73/504.12 |
| 2008/0083278 A1* | 4/2008 | Takahashi et al. | 73/504.15 |
| 2009/0241233 A1* | 9/2009 | Sulzbach et al. | 850/40 |
| 2010/0109810 A1* | 5/2010 | Hashimura | 333/197 |
| 2010/0128578 A1* | 5/2010 | Kato et al. | 369/13.24 |
| 2011/0198517 A1* | 8/2011 | Yoshii | 250/552 |
| 2013/0061357 A1* | 3/2013 | Watanabe et al. | 850/56 |

* cited by examiner

METHOD OF DETERMINING A SPRING CONSTANT OF A CANTILEVER AND SCANNING PROBE MICROSCOPE USING THE METHOD

RELATED APPLICATIONS

This application claims priority under 35 U.S.C. §119 to Japanese Patent Application No. 2011-193940 filed on Sep. 6, 2011, the entire content of which is hereby incorporated by reference.

FIELD OF THE INVENTION

The present invention relates to a method of determining a spring constant of a cantilever and a scanning probe microscope (hereinafter, abbreviated as "SPM") using the method, and more particularly, to a cantilever manufactured by a silicon process.

DESCRIPTION OF THE RELATED ART

For instance, in the SPM, it is necessary to measure a cantilever spring constant in order to measure a force applied between a sample and a cantilever probe. In particular, a spring constant of bending of the cantilever in a direction perpendicular to a sample surface is important for measuring a load at a contact position of the sample.

However, it is not easy to determine the spring constant, and various methods have been studied and proposed for measuring the spring constant of the cantilever.

For instance, in the case of the SPM, there is a method of determining the spring constant by a separate unit for detecting a thermal fluctuation of the cantilever based on an output from a cantilever displacement detection mechanism, which is a mechanism incorporated in the SPM, so as to calculate the spring constant from a predetermined relationship between the thermal fluctuation and the spring constant (Japanese Patent Application Laid-open No. Hei 10-282128). In addition, there is another method as follows (Japanese Patent Application Laid-open No. 2000-97825). A probe of a leaf spring-like member to be measured is brought into contact with a standard sample having a known spring constant, and the leaf spring-like member is moved relatively to the standard sample in a direction substantially perpendicular to a surface of the standard sample. Then, the spring constant of the leaf spring-like member is obtained from a variation of a displacement of the leaf spring-like member. These methods need a unit for detecting a thermal fluctuation and a standard sample, and the spring constant is not directly determined.

In contrast, as a method of determining the spring constant easily and directly, there is a method based on a general dynamic calculation using a Young's modulus E of a material forming the cantilever and outside dimensions of the cantilever. In this method, the cantilever is regarded as a rectangular solid cantilever, and a length L, a width "w", and a thickness "t" are measured by a microscope or the like, so as to calculate a spring constant K of the cantilever based on Equation 1. In this case, because the spring constant is determined from information about the cantilever, other means are not necessary. Therefore, there is an advantage that only the dimensional measurement needs to be performed accurately so that an accurate value of the spring constant can be obtained.

$$K = \frac{E \cdot w \cdot t^3}{4L^3} \quad \text{[Equation 1]}$$

According to this method of calculating the spring constant, the spring constant is inversely proportional to a cube of the length of the cantilever and is proportional to a cube of the thickness thereof. Here, the length of the cantilever is sufficiently larger relative to a measurement error of a measuring unit such as an optical microscope in many cases, that is, the S/N ratio is large, and hence the measurement error does not affect significantly a calculation result of the Young's modulus. However, the thickness is usually approximately a few micrometers in the case of a cantilever of the SPM, and in the observation by the optical microscope for measuring the thickness, a measurement error relative to the thickness is large due to an influence of a measurement limitation resulting from a wavelength limitation. In other words, the S/N ratio becomes small, and the measurement error has a large influence on a value of the calculated Young's modulus. Therefore, in the measurement of the thickness, the measurement error resulting from the optical microscope cannot be neglected. Therefore, the length and the width of the cantilever are measured by the optical microscope, but the thickness is measured by using another high resolution measuring method such as an electron beam microscope and a laser interferometer in many cases. However, in order to measure by the other methods such as the electron beam microscope and the laser interferometer, it is necessary to prepare such measurement equipment separately. In addition, it is necessary to perform the measurement on another stage or to incorporate the measurement equipment in the SPM.

On the other hand, the cantilever is usually manufactured by a silicon process in many cases. Depending on the process, a crystal plane is generated by anisotropic etching so that the cantilever does not have the above-mentioned rectangular solid shape but has a trapezoidal cross-sectional shape instead. In this case, because Equation 1 cannot be simply applied, the upper base and lower base lengths of the trapezoidal cross section are measured so as to calculate the spring constant of the cantilever based on Equation 2, which considers the cross-sectional shape. In this case too, it is necessary to measure the thickness as described above. Therefore, it has been necessary to reduce the measurement error of the thickness and hence to measure the thickness by the other method such as the electron beam microscope and the laser interferometer similarly to the above-mentioned case.

As described above, when the dimensions of the cantilever are measured for measuring the spring constant of the cantilever, measurement accuracy of the thickness of the cantilever significantly affects a value of the spring constant to be determined. Therefore, in order to measure the thickness, it has been necessary to use not the optical microscope but the electron beam microscope or the laser interferometer having a higher resolution. However, for this purpose, it is necessary to separately prepare the electron beam microscope or the laser interferometer, and the measurement has been more complicated than observation by the optical microscope.

SUMMARY OF THE INVENTION

Therefore, the present invention provides a method of accurately determining a spring constant of a cantilever by measuring necessary outside dimensions of the cantilever except for a thickness thereof only by an optical microscope, and by accurately determining the thickness through adoption of geometric analysis utilizing characteristics common in anisotropic etching of a silicon process.

According to an exemplary embodiment of the present invention, there is provided a method of determining a spring constant of a cantilever, the cantilever having one end as a free end and another end connected to a silicon substrate as a pedestal in a cantilevered state, the cantilever being manufactured by anisotropic etching in a silicon process to have a trapezoidal cross-sectional shape, the cantilever including a probe on the free end side of a surface thereof, which is opposite to a connecting surface to the pedestal, the method including: obtaining, based on crystal plane indices of the silicon substrate and crystal plane indices of a surface generated by the anisotropic etching of the silicon substrate, an angle θ between the surface generated by the anisotropic etching and a surface of the silicon substrate; measuring each of a length "a" of an upper base and a length "b" of a lower base of the trapezoidal cross-sectional shape of the cantilever; measuring a longitudinal length L of a part of a lever portion protruding from the pedestal of the cantilever, the part being provided from an end portion of the pedestal to a vertical position of a tip portion of the probe; obtaining, based on the lengths of the upper base and the lower base and the angle θ, a thickness "t" of the cantilever; and calculating and determining a spring constant K of the cantilever based on the outside dimensions of the cantilever and a Young's modulus E of a material of the silicon substrate.

According to the method of determining a spring constant of a cantilever of the present invention, when the cantilever is manufactured by a silicon process, the cantilever having a trapezoidal cross section is observed only from the probe side (upper base of z-axis in FIG. 1) so that outside dimensions of the cantilever are measured. The thickness thereof is not measured directly by an optical microscope but is determined through geometric calculation based on the lengths of the upper base and the lower base of the trapezoidal cross section of the cantilever and the angle between the surface generated by the anisotropic etching and the surface of the silicon substrate serving as the pedestal of the cantilever. Thus, the thickness can be determined without being affected by limitation of resolution of the optical microscope, and hence the cantilever spring constant can be determined easily and accurately.

DETAILED DESCRIPTION OF THE PREFERRED EMBODIMENTS

A method of measuring a spring constant of a cantilever according to an embodiment of the present invention is described below with reference to the attached drawings.

Figure 1:
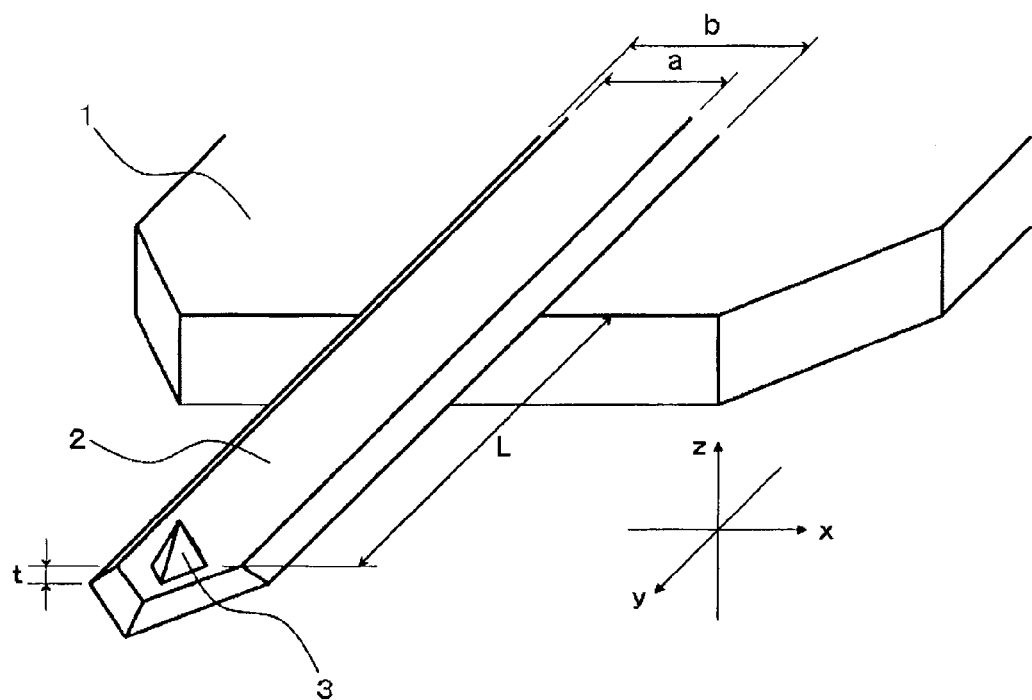
FIG. 1 is a conceptual diagram illustrating a cantilever having a trapezoidal cross section according to an embodiment of the present invention.

As described above, depending on a process of manufacturing a cantilever, each side surface of the cantilever becomes an oblique surface due to anisotropic etching. Therefore, a cross-sectional shape of the cantilever becomes a trapezoidal shape. An external view of the cantilever having such a shape is illustrated in the explanatory diagram of FIG. 1, which illustrates a structure in which a flat surface corresponding to the lower base among flat surfaces corresponding to the parallel upper and lower bases of the trapezoid is held in contact with a cantilever substrate 1, and a probe is mounted to the surface corresponding to the upper base. As illustrated in FIG. 1, it is supposed that an end surface direction of the cantilever substrate corresponds to an x-axis direction, a longitudinal direction of the cantilever corresponds to a y-axis direction, and the direction that the probe faces corresponds to a z-axis direction in the following description.

Figure 3:
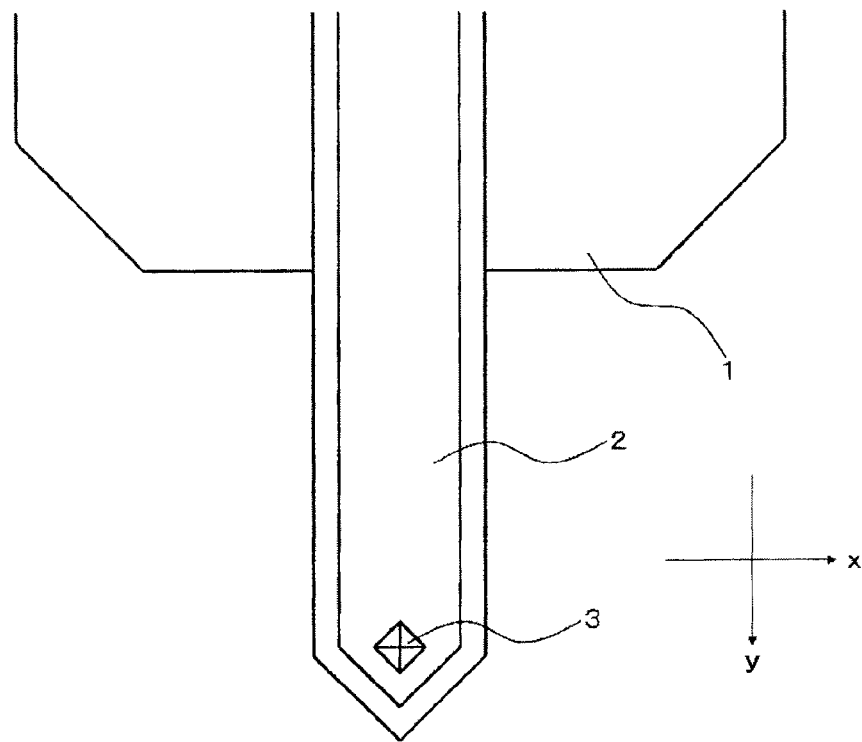
FIG. 3 is an explanatory diagram illustrating a shape of the cantilever having the trapezoidal cross section according to an embodiment of the present invention, viewed from the side to which a probe faces.
Figure 4:
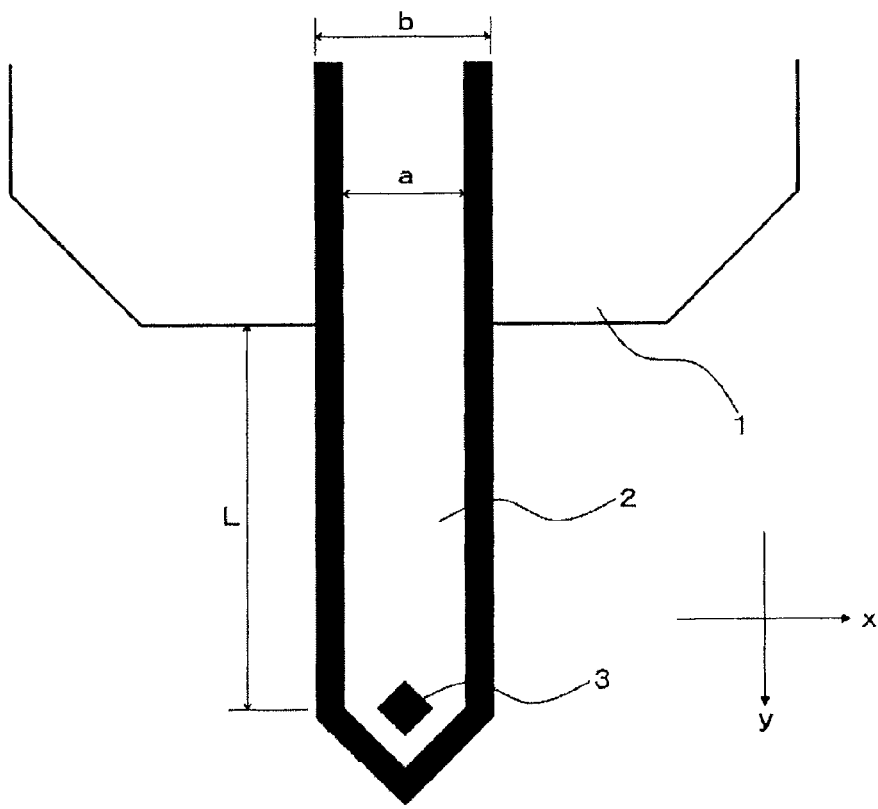
FIG. 4 is an explanatory diagram illustrating an optical microscope image when the cantilever having the trapezoidal cross section according to an embodiment of the present invention is observed by the optical microscope while being irradiated with illumination light from the side which the probe faces.

FIG. 3 illustrates the cantilever having the above-mentioned shape observed from the upper base of the z-axis so that a flat surface direction of the cantilever becomes parallel to an observed flat surface. When the cantilever of FIG. 3 is observed by an optical microscope from the upper base of the z-axis while being irradiated with illumination light from the upper base of the z-axis, an image as illustrated in FIG. 4 is observed. Here, the oblique surface portions of a probe 3 and of the side surfaces of a cantilever 2 are observed dark because the objects are inclined with respect to the illumination light so that the reflected light does not enter the microscope. Besides this, surfaces of the cantilever substrate 1 and of the upper base of the cantilever 2 are observed bright because the reflected light is reflected in the z-axis direction so as to enter the microscope. Based on bright and dark positions of the microscope image of the cantilever observed as described above, a length "b" of the lower base is measured and determined as an interval between outer edges of the dark portion of both side surfaces, a length "a" of the upper base is measured and determined as an width of the bright portion between the dark portions of the side surfaces, and a length L of the cantilever is measured and determined as a length from the edge of the cantilever substrate 1 to the probe 3.

Figure 2:
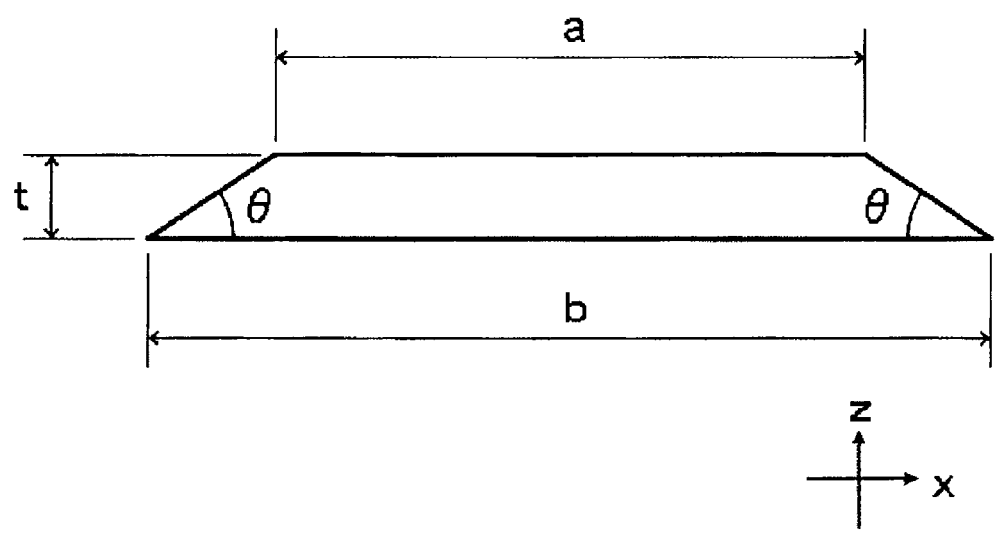
FIG. 2 is an explanatory diagram illustrating the trapezoidal cross section of the cantilever manufactured by anisotropic etching according to an embodiment of the present invention.

In addition, the side surface of the cantilever has a particular crystal plane due to the anisotropic etching, and the angle of the side surface becomes a constant value due to a crystal direction. Therefore, it is not necessary to measure an angle θ between the oblique surface of the side surface and the lower base illustrated in FIG. 2, and the angle θ is always constant.

In the anisotropic etching of a monocrystal silicon substrate, an etching rate is different depending on a direction of the crystal plane. Therefore, the surface generated by the etching becomes a smooth surface having a precise angle along the crystal plane of a crystal structure. With use of this property, the thickness "t" necessary for determining outside dimensions of the cantilever can be calculated geometrically without an actual measurement thereof only by measuring the other outside dimensions. In this way, there is no error in measuring the thickness of the cantilever, which has been difficult to exclude in the actual measurement, and it is sufficient to measure only the upper base and lower base lengths of the cantilever, which have a small measurement error. Thus, the thickness of the cantilever can be determined efficiently and accurately.

In addition, the anisotropic etching is performed in general using an aqueous solution of potassium hydroxide or hydroxyoxide on the monocrystal silicon substrate. As to the monocrystal silicon, when crystal plane indices of the surface to be etched are (100), it can be determined that crystal plane indices of the surface generated by the etching is a (111) surface due to the crystal structure property. Therefore, based on a geometric relationship therebetween, it can be determined that an angle between those surfaces, that is, an angle (θ in FIG. 2) between the lower base and the oblique side of the trapezoidal shape as the cross section of the cantilever is 54.7 degrees. Therefore, the height of the trapezoidal shape can be determined as the thickness "t" of the cantilever from Equation 2.

$$t = \frac{b-a}{2} \cdot \tan\theta \qquad \text{[Equation 2]}$$

When the cantilever is manufactured by performing the anisotropic etching in the silicon process on the silicon substrate as a pedestal as described above, the angle θ generated in the cross-sectional shape of the cantilever may be fixed at 54.7 degrees.

In this way, the thickness "t" of the cantilever can be determined accurately also by measuring necessary lengths using the optical microscope.

Next, as described above, the upper base and lower base lengths of the cantilever having the trapezoidal cross-sectional shape are obtained by direct observation, and the thickness "t" of the cantilever can be determined by calculation. Therefore, when the spring constant K of Equation 1 is derived from the obtained data, Equation 3 is a basic equation. Here, "I" represents a secondary moment of the cross section.

$$K = \frac{3EI}{L^3} = \frac{E \cdot t^3 \cdot (a^2 + 4ab + b^2)}{12 \cdot L^3 \cdot (a+b)} \qquad \text{[Equation 3]}$$

Alternatively, Equation 4 is derived from Equation 2 and Equation 3. Therefore, in terms of calculation, the cantilever spring constant K can be determined directly from the measured data without calculating the thickness t of the cantilever.

$$K = \frac{E \cdot (b-a)^3 \cdot \tan^3\theta \cdot (a^2 + 4ab + b^2)}{96 \cdot L^3 \cdot (a+b)} \qquad \text{[Equation 4]}$$

As described above, the method of determining a spring constant K of a cantilever according to the present invention is a very effective method of a cantilever manufactured using the anisotropic etching in the silicon process. Therefore, according to the present invention, it is possible to obtain a very reliable spring constant compared with a spring constant determined through the conventional method in which the thickness of the cantilever is directly measured.

In addition, the method of determining a spring constant of a cantilever according to the present invention can be used for the SPM. In this case, the optical microscope that is usually incorporated in the SPM can be used as it is. Therefore, without adding a new facility, the cantilever spring constant K can be determined accurately before measurement by the SPM.

What is claimed is:

1. A method of manufacturing a cantilever for use in a scanning probe microscope, the method comprising:
    anisotropically etching out the cantilever from monocrystal silicon to have cross-sections along a length of the cantilever in a form of an isosceles trapezoid, the cross-sections including a first flat surface corresponding to a lower base of the isosceles triangle, the first flat surface extensive along a (100) crystal plane of the monocrystal silicon, the cross-sections further including a second flat surface which is substantially parallel to the first flat surface and which corresponds to an upper base of the isosceles triangle, the cross-sections further including oblique side surfaces joining the first flat surface and the second flat surface, the oblique side surfaces extensive along a (111) crystal plane of the monocrystal silicon:
    measuring widths of upper and lower bases of the trapezoid and a length of the cantilever; and
    calculating the spring constant from Young's modulus (E), a secondary moment (I) of the cross-section of the cantilever, and the measured length (L) of the cantilever, wherein calculating the spring constant comprises calculating the secondary moment (I) from the measured widths of the upper and lower bases of the trapezoid, and an internal angle of the trapezoid defined by the predetermined crystal planes.

2. The method according to claim 1, further comprising:
    calculating an altitude of the trapezoid from the measured widths of the upper and lower bases of the trapezoid and the internal angle,
    wherein the calculating the secondary moment (I) comprises using the measured widths of the upper and lower bases of the trapezoid to calculate the secondary moment (I).

3. The method according to claim 1, wherein the first flat surface is configured for connection to a silicon substrate as a pedestal in a cantilevered state and wherein the second flat surface is configured to be mounted with a probe for use in the scanning probe microscope.

4. The method according to claim 1, wherein measuring widths of upper and lower bases of the trapezoid and a length of the cantilever comprises:
    illuminating a base surface of the cantilever vertically in an altitude direction of the trapezoid in an optical microscope;
    visually discerning the vertically illuminated base surface from the obliquely illuminated leg surface, including discerning outer edges of the vertically illuminated base surface and inner edges of the obliquely illuminated leg surface;
    determining a length of the lower base as an interval between the outer edges of the vertically illuminated base surface; and
    determining a length of the upper base as an interval between the inner edges of the obliquely illuminated leg surface.

5. A scanning probe microscope comprising a cantilever anisotropically etched out from monocrystal silicon, the cantilever having cross-sections along a length of the cantilever in a form of an isosceles trapezoid, the cross-sections including a first flat surface corresponding to a lower base of the isosceles triangle, the first flat surface extensive along a (100) crystal plane of the monocrystal silicon, the cross-sections further including a second flat surface which is substantially parallel to the first flat surface and which corresponds to an upper base of the isosceles triangle, the cross-sections further including oblique side surfaces joining the first flat surface and the second flat surface, the oblique side surfaces extensive along a (111) crystal plane of the monocrystal silicon, and the cantilever being sized to have a spring constant calculable from Young's modulus (E), a secondary moment (I) of the cross-section of the cantilever, and a length (L) of the cantilever, wherein the secondary moment (I) is calculable from widths of the upper and lower bases of the trapezoid, and an internal angle of the trapezoid defined by the predetermined crystal planes.

6. The scanning probe microscope according to claim 5, wherein the cantilever is given a spring constant calculated from the secondary moment (I) which in turn is calculable from an altitude of the trapezoid, which is geometrically calculated from the widths of the upper and lower bases of the trapezoid and the internal angle.

7. The scanning probe microscope according to claim 5, wherein the predetermined crystal planes extend in a (100) direction and a (111) direction, respectively.

\* \* \* \* \*